United States Patent [19]

Alexander et al.

[11] 3,884,447
[45] May 20, 1975

[54] FLUID VALVE MEANS
[75] Inventors: Carl J. Alexander, Moore Park; Robert J. Boudeman, Hickory Corners, both of Mich.
[73] Assignee: Wells Manufacturing Corporation, Three Rivers, Mich.
[22] Filed: June 6, 1973
[21] Appl. No.: 367,445

[52] U.S. Cl. ........... 251/144; 137/525; 251/DIG. 3; 251/339; 267/166
[51] Int. Cl. ..................... F16k 15/14; F16k 31/524
[58] Field of Search ....... 251/DIG. 3, 144; 137/525; 267/166; 260/87.5

[56] References Cited
UNITED STATES PATENTS

| | | | |
|---|---|---|---|
| 1,246,355 | 11/1917 | Thomas | 137/625.28 X |
| 1,967,352 | 7/1934 | Earle | 137/625.33 X |
| 2,363,279 | 11/1944 | Anschicks | 251/DIG. 3 |
| 2,369,005 | 2/1945 | Anschicks | 251/DIG. 3 |
| 2,638,925 | 5/1953 | Monahan | 251/DIG. 3 |
| 3,500,870 | 3/1970 | Ely, Jr. et al. | 260/87.5 A |
| 3,513,874 | 5/1970 | Welsh et al. | 137/525 |
| 3,711,917 | 1/1973 | Baumgras | 267/166 X |

FOREIGN PATENTS OR APPLICATIONS
389,936   7/1908   France ........................... 137/625.33

*Primary Examiner*—William R. Cline
*Attorney, Agent, or Firm*—Dressler, Goldsmith, Clement & Gordon, Ltd.

[57] ABSTRACT

Fluid valve means comprises a coil of metallic spring wire having a plurality of convolutions and an outer sheath of a resilient material about the convolutions, the material having a substantially uniform radial thickness and exerting a radial compressive force on the spring wire along the length of the convolutions. The valve means is operable by parting or compressing the convolutions thereof, and is manufactured by threading a substantially uniform tubing made of a resilient material onto a spring made of coiled spring wire. The threading operation is accomplished by providing an uncoiled tail portion for the spring, first threading the tubing onto the tail portion, and thereafter transferring the threaded tubing from the tail portion onto a coiled portion of the spring.

4 Claims, 5 Drawing Figures

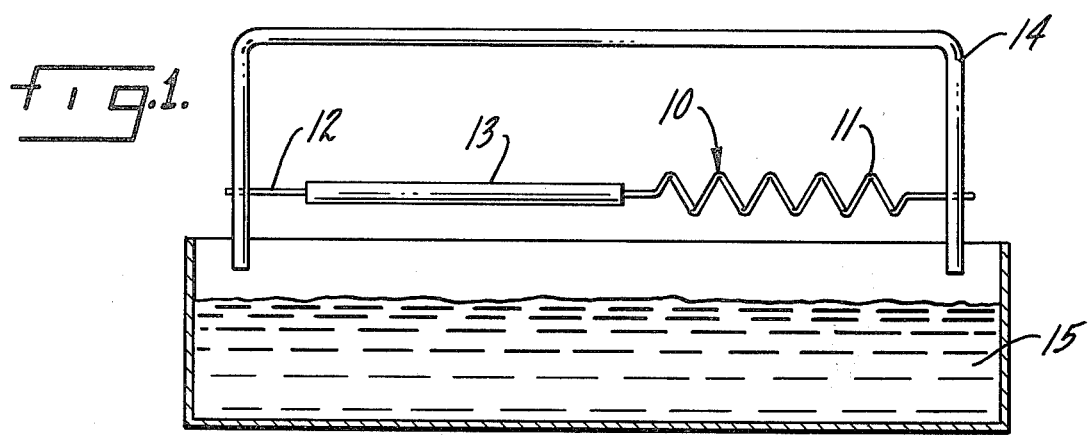
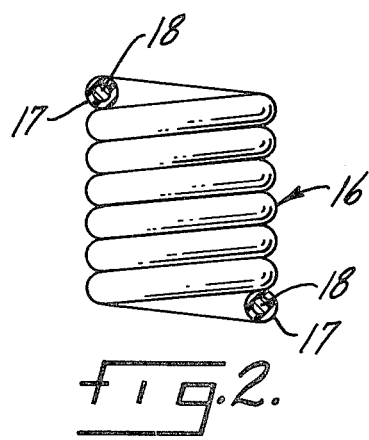
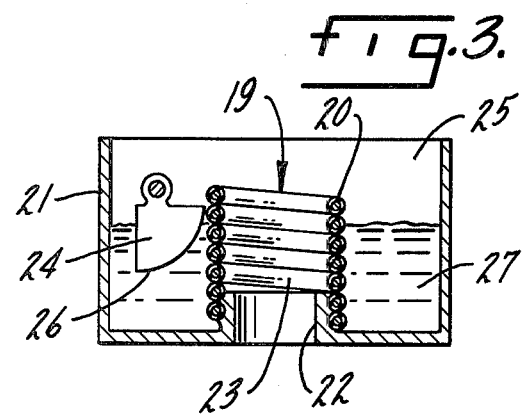
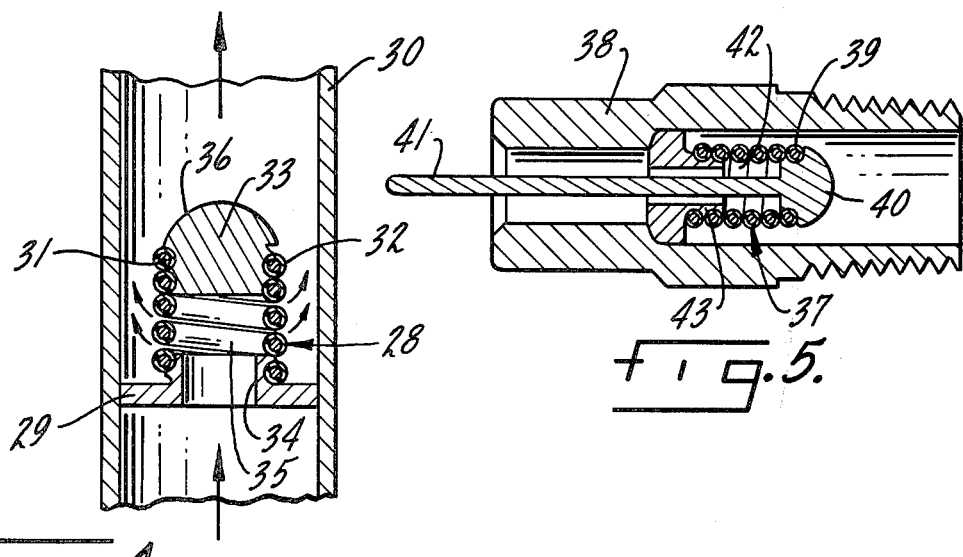

FLUID VALVE MEANS

BACKGROUND OF THE INVENTION

This invention relates to fluid valves.

Utilization of coil springs as valving means for fluids is known in the art and is taught in British Pat. No. 1,217,538. However, because of non-uniformities usually present in coil springs it is difficult if not impossible to economically manufacture a fluid-tight coil spring. Swedish Pat. No. 153,362 teaches that sealing between adjacent turns of coil springs can be provided by coating the spring with rubber. However, because of the configuration of a coil spring, a uniform coating thereon providing a fluid-tight relationship between adjacent convolutions of the coil spring is difficult to achieve in production at an economical cost.

Inasmuch as metallic springs are manufactured by coiling a suitable wire, residual stresses are induced in the springs and must be relieved. The stress relieving procedure involves heating the coiled spring to an elevated temperature and keeping the spring at that temperature for a predetermined time period. Stress relief temperatures, of course, vary with the spring wire being utilized and can range from about 400°F. for music wire or oil-tempered steel wire to about 850°F. for 18-8 stainless steel wire. From the foregoing it is readily apparent that an elastomeric coating applied to a spring prior to coiling and stress relief will be destroyed during the subsequent stress relieving operations, yet it is extremely difficult to apply uniform coating to a spring after stress relief.

It is an object of the present invention to obviate the aforementioned problems and to provide a manufacturing method whereby a substantially uniform, resilient outer sheath, rather than a coating, is applied to an already stress-relieved, coiled spring.

It is a further object of this invention to provide an improved fluid valve means which is capable of regulating the flow of fluids with a reduced pressure drop across the valve means.

Yet another object of this invention is to provide a long-lasting fluid valve means which requires very little force for actuation.

Still further objects of this invention will readily present themselves to the skilled artisan upon reference to the ensuing specification, the drawing and the claims.

SUMMARY OF THE INVENTION

The present invention comtemplates a fluid valve means comprising a coil-type spring metallic spring wire having a plurality of convolutions and defining a central fluid passageway; an outer sheath of a resilient material, having a substantially uniform radial thickness, on the convolutions of said spring and exerting a radial compressive force on the spring wire along the length of said convolutions, the adjacent outer sheath-bearing convolutions being adapted to form a fluid-tight relationship relative to each other; and an actuator means operably associated with said spring and adapted to move adjacent convolutions relative to each other so as to regulate fluid permeability of said central fluid passageway.

A spring of either compression- or tension-type having a substantially uniform outer sheath of a resilient material is manufactured by providing a coil-type spring made of spring wire and having a coiled portion of a plurality of convolutions and a relatively straight tail portion, the length of the wire in said tail portion being at least equal to the length of the wire in said coiled portion; providing a length of substantially uniform tubing made of a resilient material; threading said length of tubing onto said tail portion; and thereafter threading the length of tubing from said tail portion onto said coiled portion of said spring.

BRIEF DESCRIPTION OF THE DRAWING

In the drawing,

FIG. 1 is an elevational view, partly in section, showing a jig and a heating bath which can be utilized in producing springs provided with a substantially uniform outer sheath of a resilient material in accordance with the present invention;

FIG. 2 is an elevational view, partly in section, showing a closely wound tension spring having a substantially uniform outer sheath of resilient material produced in accordance with this invention;

FIG. 3 is a sectional view showing a fluid dump valve means utilizing the present invention;

FIG. 4 is a sectional view showing a fluid check valve means utilizing the present invention; and FIG. 5 is a sectional view showing an animal watering valve embodying the present invention.

DESCRIPTION OF THE PREFERRED EMBODIMENTS

The method of practicing the manufacturing method of this invention is illustrated in FIG. 1. On metallic tension spring 10, made of suitable spring wire and comprising coiled portion 11 having a plurality of convolutions and relatively straight tail portion 12, is threaded a length of substantially uniform, expanded tubing 13 made of a resilient material. Inasmuch as expanded tubing 13 is of the same length as coiled portion 11, tail portion 12 is at least as long as the length of spring wire in coiled portion 11 in order to accomodate the full length of tubing 13.

Thereafter tension spring 10 is extended to a degree sufficient to part the convolutions of coiled portion 11, but without exceeding its elastic limit, in jig 14 or by similar means, and expanded tubing 13 from tail portion 12 is threaded onto coiled portion 11 and then collapsed about coiled portion 11.

Tubing 13 is selected so that in its expanded state the inner diameter of the tubing is greater than the outer diameter of the spring wire of the tension spring such as spring 10, and so that the inner diameter of the tubing in its collapsed state is less than outer diameter of the spring wire, thereby exerting a radial compressive force on the spring wire when collapsed. In this manner a tightly fitting outer sheath about coiled portion 11 of spring 10 is assured. Thickness of the resulting resilient outer sheath is not overly critical; however, for fluid valve applications it is preferred that the thickness of the outer sheath is at least about 0.25 times the diameter of the enveloped spring wire.

Tubing 13 can be expanded by passing a stream of gas or liquid therethrough at an elevated pressure while being threaded on tension spring 10. The gas or liquid stream passing therethrough also acts as a lubricant and facilitates threading tubing 13 onto coiled portion 11. Collapse of tubing 13 about coiled portion 11 is accomplished by shutting of the gas or liquid stream.

In the alternative, previously expanded but heat-shrinkable tubing can be utilized. In such an event a length of the expanded, heat-shrinkable tubing 13 is threaded onto tail portion 12, tension spring 10 extended by mounting in jig 14, tubing 13 then threaded from tail portion 12 onto coiled portion 11, and then collapsed about coiled portion 11 by immersion in hot liquid bath 15 such as a hot water bath or hot oil bath, depending on the temperature needed to collapse tubing 13.

Once tubing 13 is collapsed, tension spring 10 is removed from jig 14 or similar spring extender means and tail portion 11 severed therefrom thereby producing a coil-type tension spring such as closely-wound spring 16 shown in FIG. 2 having outer sheath 17 of substantially uniform radial thickness enveloping coiled spring wire 18 and exerting a radial compressive force on spring wire 18 along the length of the convolutions of spring 16. The adjacent, outer sheath 17-bearing convolutions of spring 16 are in fluid-tight relationship relative to each other. The produced spring 16 is particularly useful for fluid valves such as check valves, animal watering valves, faucet valves, metering valves, toilet flush valves, and the like, as will be discussed in greater detail hereinbelow.

A compression spring clad with an outer sheath of a resilient material can be produced in a similar manner except, of course, a compression spring in most instances need not be extended prior to the threading of the resilient tubing thereon.

Metallic spring wire suitable for the purposes of this invention can be selected from a wide variety of materials, depending upon the ultimate application. Typical materials are music wire, oil-tempered steel wire, hard drawn carbon steel wire, chrom-vanadium steel wire, chrome-silicon steel wire, silicomanganese steel wire, 18-8 stainless steel wire, beryllium copper wire, phosphor bronze wire, brass wire, and the like.

Where the tubing material forming the outer sheath for the tension spring is to be expanded by passing a gas or liquid stream therethrough at an elevated pressure, tubing materials such as rubber, polyethylene, polychloroprene (neoprene), polytetrafluoroethylene, and the like are suitable.

Where the outer sheath is to be formed using an expanded, heat-shrinkable material, typical suitable tubing materials are heat-shrinkable cross-linked polyolefins, heat-shrinkable irradiated polychlorophrene (neoprene), heat-shrinkable polyvinyl chloride, heat-shrinkable copolymers of tetrafluoroethylene and 5 to about 50 weight percent hexafluoropropylene such as those disclosed in U.S. Pat. Nos. 3,265,092 and 3,500,870, and the like.

To form the outer sheath from heat-shrinkable tubing, the tubing can be collapsed by heating, preferably to about its gel point, in any convenient manner. For example, heating can be done in an oven, by flame, or by immersion in a hot liquid bath such as hot oil or hot water bath. Immersion in a hot liquid bath is preferred because of the uniformity of collapse that can be achieved thereby. The minimum temperature needed to effect collapse varies depending on the particular material and can be as low as about 125°F. for partially collapsing heat-shrinkable neoprene tubing and usually is in the range of about 275°F. to about 450°F. for irradiated polyolefins and tetrafluoroethylene copolymers. Since springs tend to take a set at elevated temperatures and suffer a loss in load as well as a reduction in the modulus of rigidity, preferably heat-shrinkable tubing compatible with the contemplated service requirements and which can be collapsed at a relatively low temperature is utilized.

A fluid dump valve embodying the present invention is shown in FIG. 3. Closely wound coil-type tension spring 19 made of steel and covered with neoprene outer sheath 20 is mounted in fluid reservoir 21 over outlet aperture 22 by means of a threaded nipple. The adjacent convolutions of spring 19 are in fluid-tight relationship relative to each other and together define fluid passageway 23. Dump valve actuating means 24 is pivotally mounted in wall 25 of reservoir 21 and is equipped with cam surface 26 which abuts spring 19 and, when actuated, deflects spring 19 sideways, thereby parting the convolutions thereof and permitting fluid 27 to flow into passageway 23 and out through aperture 22. Of course, any means of parting the coil is acceptable. Also, in some instances, a delay mechanism may be incorporated in the actuating means so that the coil remains parted for a predetermined time period.

Another fluid valve means embodying the present invention and suitable for use as a check valve is shown in FIG. 4. Coil-type spring 28 is threaded onto hollow nipple 29 which serves as an inlet means for the check valve and which is secured in fluid conduit 30. The direction of fluid flow within conduit 30 is indicated by arrows. Closely wound coils 31 of spring 28 are made of steel and are covered by outer sheath 32 made of heat-shrinkable copolymer of tetrafluoroethylene and 5 to about 50 weight percent hexafluoropropylene and collapsed about coils 31 by immersion in a liquid oil bath maintained at about 275°F. Fluid impermeable cover means such as cap 33 is threaded onto one end of spring 28 and the other end of spring 28 is situated over aperture 34 and secured over externally-threaded nipple 29 which forms a base. In this manner, fluid entering passageway 35, defined by the outer sheath-clad convolutions of spring 28, bears against cap 33 and parts the convolutions, thereby permitting unidirectional flow. As soon as the force against cap 33 is less than the counter force exerted by spring 28, the adjacent convolutions of spring 28 resume their fluid-tight relationship relative to each other and fluid flow in conduit 30 terminates. By selecting a suitable configuration for trailing surface 36 of cap 33, for example a hemispherical configuration, controlled oscillations can be induced in spring 28 when the convolutions thereof are parted and a fluid flows therethrough. This provides a further advantage inasmuch as the oscillations render the check valve means self-cleaning and an accumulation of undesirable deposits on the sealing surfaces in minimized. In addition, it has been found that fluid valves of this invention exhibit a substantially lower pressure drop thereacross than comparable conventional valves and also provide a considerably more accurate control of flow rate.

Still another fluid means, an animal watering valve, embodying the present invention is shown in FIG. 5. Coil-type tension spring 37 having closely wound convolutions clad with a resilient outer sheath of neoprene and forming a fluid-tight passageway 42 is secured onto externally-threaded nipple 43 which, in turn, is mounted within a generally cylindrical, hollow valve body 38 and in a substantially axial alignment therewith. Inlet end 39 of spring 37 is closed by fluid impermeable cap 40 which is threaded into spring 37. Valve actuating lever 41 extends from cap 40 inwardly through passageway 42 and projects outwardly from one end of valve body 37. In this manner spring 37 can be selected sufficiently strong to provide leakproof valving at all times, yet the mechanical advantage afforded by actuating lever 41, the length of which can be selected as desired, makes this watering valve particularly suitable for use in research laboratories because it can be readily operated by very small animals such as baby mice and by sick or weakened animals as well.

The foregoing specification and the drawing are intended to be illustrative and are not to be taken as limiting. Still other applications of the invention and further variations and modifications within the spirit and scope of this invention are possible and will become apparent to one of ordinary skill in the art.

We claim:

1. A flushing fluid dump valve means comprising
a flushing fluid reservoir having an outlet aperture;
a coil of closely wound metallic spring wire having a plurality of convolutions within said fluid reservoir, defining a fluid passageway in said reservoir, and having one open end thereof secured about said outlet aperture so that the passageway defined by said coil communicates with said outlet aperture through the secured end and with said fluid reservoir through a free open end;
an outer sheath collapsed on said spring wire, made of resilient material having a substantially uniform radial thickness and exerting a radial compressive force along the length of said spring wire; and
flushing fluid dump valve actuating means mounted in said reservoir and adapted to deflect said coil;
said coil bearing said outer sheath extending inwardly into said flushing fluid reservoir and providing a flushing fluid retaining portion below the free open end of said coil, and adjacent convolutions of said coil bearing said outer sheath being in fluid-tight relationship relative to each other but permitting the flushing fluid to pass between the convolutions and out through said outlet aperture when said coil is deflected.

2. The fluid dump valve means in accordance with claim 1 wherein the outer sheath is polychloroprene.

3. The fluid dump valve means in accordance with claim 1 wherein the outer sheath is a copolymer of tetrafluoroethylene and about 5 to about 50 weight percent hexafluoropropylene.

4. The fluid dump valve in accordance with claim 1 wherein said dump valve actuating means is a movable member having a cam surface.

* * * * *